Patented Aug. 6, 1935

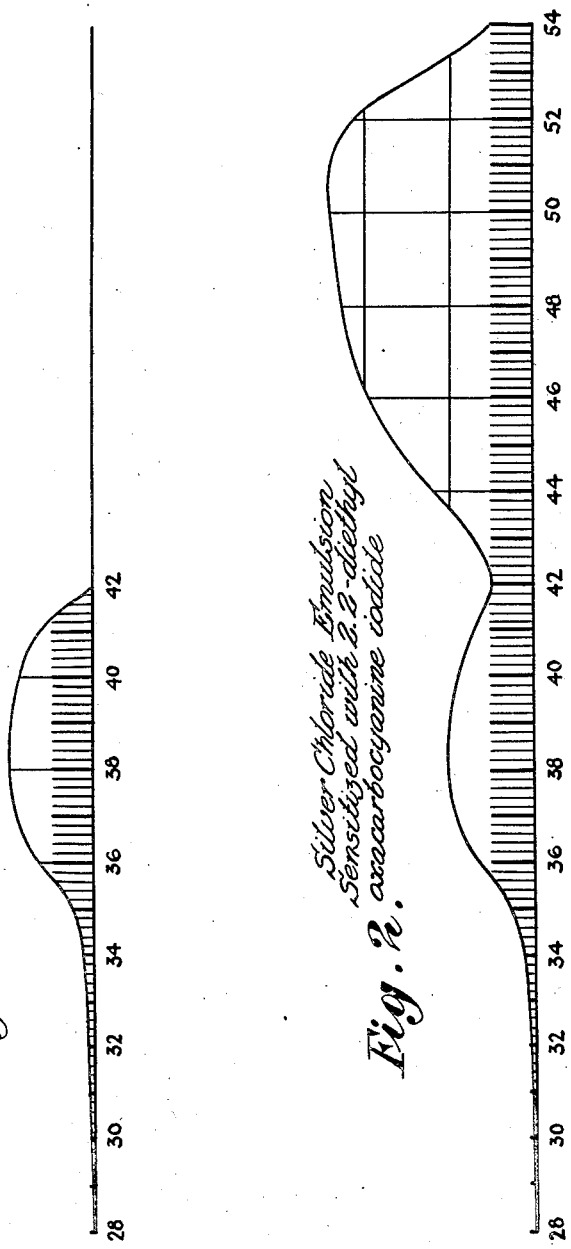

2,010,388

UNITED STATES PATENT OFFICE 2,010,388

PHOTOGRAPHIC EMULSION

Olaf Bloch, Ilford, England, assignor to Ilford Limited, Ilford, England, a British company Application April 7, 1932, Serial No. 603,902
In Great Britain April 13, 1931

11 Claims. (Cl. 95—7)

This invention comprises improvements in or relating to photographic emulsions.

Silver bromide emulsions, and emulsions comprising a mixture of silver bromide and silver iodide normally possess a sensitivity ranging from the ultra violet down to a lower limit of about 5000 A. U. The sensitivity of silver chloride emulsions on the other hand is confined to the ultra violet and extreme violet end of the spectrum.

The chief advantages which can be achieved by use of silver chloride emulsions are due to their very fine grain. It is however extremely difficult to increase the speed of silver chloride emulsions beyond certain limits by the methods ordinarily adopted in the emulsion-making art, such for example as digesting the emulsion, without producing undesirable effects such as coarser grain or fog. It is the principal object of the present invention to provide a method of increasing the speed of emulsions containing silver chloride, either washed or unwashed, without increasing their grain size or inducing chemical fog.

The present invention therefore introduces, in the manufacture of a photographic emulsion containing silver chloride, the step of increasing substantially the speed of the emulsion by treating it with a sensitizing dye of the cyanine group.

More particularly the invention comprises the step of treating an emulsion containing silver chloride with a sensitizing dye of the carbocyanine class under conditions adapted to increase the speed of the emulsion and sensitize it in that region of the spectrum to which a silver bromide emulsion is normally sensitive but not to red light nor to any substantial extent to green light.

The improved result obtained by practicing the present invention is illustrated in the accompanying drawing, in which Figure 1 shows the sensitivity curve of a plain chloride emulsion; and Figure 2 is the corresponding sensitivity curve of the same emulsion when sensitized with 2:2'-diethyloxacarbocyanine iodide.

It is of course well known that bromide and iodo-bromide, chloride and mixed halide emulsions generally may be rendered sensitive to the green and red regions of the spectrum by incorporating therein certain sensitizing dyes. It has not however been hitherto known to increase the speed of emulsions consisting largely of silver chloride by adding to their normal sensitiveness a sensitiveness residing almost entirely in the blue and blue-green sections of the spectrum.

In the preferred form of the invention, the emulsion is treated with a dye or dyes of the oxacarbocyanine or thio-oxacarbocyanine class, with the exception of the nitro compounds which are not sensitizers. By addition of an oxacarbocyanine or thio-oxacarbocyanine sensitizing dye to a silver chloride emulsion the speed of the emulsion may be increased by as much as 10 times, according to the method of treatment and quantity of dye used. In the case of an emulsion comprising a mixture of silver chloride and silver bromide an increase of speed of 3 to 4 times has been obtained.

According to a further feature of the invention, the quantity of dye incorporated in the emulsion may comprise about 0.05% of any lesser quantity by weight reckoned on the quantity of silver nitrate used in making the emulsion, according to the magnitude of the effect desired.

The addition of oxacarbocyanines to emulsions containing silver chloride is found not only to increase the speed of the emulsion, but also to sensitize it in that region of the spectrum to which a silver bromide emulsion is normally sensitive, but not to red light nor to any substantial extent to green light. As illustrated in Figure 1 of the drawing, in which the abcissæ represent the wave length in Angstrom units, indicated in hundreds, and the ordinates represent the sensitivity, the normal sensitivity of a silver chloride emulsion extends from approximately λ2800 to λ4200, being weak at both extremities. The extra sensitivity conferred upon it by oxacarbocyanine is a band having its centre at λ4800 and fading away on each side to λ4200 and λ5400 respectively while the extra sensitivity conferred by thio-oxacarbocyanine has a similar range extending from λ4400 to about λ5600, as shown in Figure 2.

The emulsion is conveniently made in known manner by the double decomposition of silver nitrate and a soluble chloride in presence of gelatine, and may be either washed or unwashed before coating on its support. As an example, 2:2' diethyloxacarbocyanine iodide is added to the emulsion in the proportion of about 0.1 gm. of the dye per 250 gms. of silver nitrate used in making the emulsion, i. e. 0.05% dye reckoned on the weight of silver nitrate used for the emulsion, or 0.07% dye reckoned on the weight of silver in the emulsion.

In one example of the preparation of an actual emulsion 550 gms. of gelatine, 4½ litres of water and 110 gms. of sodium chloride were brought into solution at 120° F. and into this was run a solution of silver nitrate containing 250 gms. of silver nitrate dissolved in 500 ccs. of water at 120° F. This solution was then digested for 10 minutes at a temperature of 120° F. and the emulsion was set, shredded and washed. After washing the emulsion was melted out to a temperature of 100° F. and the oxacarbocyanine dye, in the proportion specified above, was then incorporated before the emulsion was applied to its support.

Instead of adding the dye to the emulsion just before coating, it may be incorporated at any other stage between washing and coating, or again the plates or other supports to which the emulsion is to be applied may, after coating, be bathed in a solution of the dye. Certain other oxacarbocyanine dyes which are sensitizers may also be employed in carrying out this invention.

It has been already pointed out that by the addition of a comparatively small amount of the sensitizing dye a substantial increase in the speed of the emulsion can be obtained. For example an emulsion having a relative threshold speed represented by the figure 2.5 when free from dye had a relative threshold speed of about 28 after incorporation of 0.05% (reckoned by weight on the quantity of silver nitrate used in the making of the emulsion) of 2:2' diethyloxacarbocyanine iodide. As the amount of dye is increased up to the above proportion the threshold speed increases rapidly, but if the proportion of this particular dye be increased beyond the above amount there is very little further effect on the threshold speed.

The invention includes a photographic emulsion containing silver chloride which has been treated with a dye of the type described herein, and photographic materials prepared by coating such emulsions on a support such as glass, celluloid, paper or other surface.

I claim:

1. In the manufacture of a photographic emulsion containing silver chloride, the step of increasing substantially the speed of the emulsion by treating it with sensitizing dyes of the oxacarbocyanine class.

2. In the manufacture of a photographic emulsion containing silver chloride, the step of increasing substantially the speed of the emulsion by treating it with 2:2' diethyloxacarbocyanine iodide.

3. In the manufacture of a photographic emulsion containing silver chloride, the step of increasing substantially the speed of the emulsion by incorporating with it 2:2' diethyloxacarbocyanine iodide in amount about 0.05% reckoned by weight on the quantity of silver nitrate used in the making of the emulsion.

4. A photographic emulsion which is sensitive to that region of the spectrum to which a silver bromide emulsion is normally sensitive but not to red light nor to any substantial extent to green light, said emulsion comprising silver chloride and 2:2' diethyloxacarbocyanine iodide.

5. A photographic emulsion which is sensitive to that region of the spectrum to which a silver bromide emulsion is normally sensitive but not to red light nor to any substantial extent to green light, said emulsion comprising silver chloride and a sensitizing dye of the oxacarbocyanine class in amount up to about 0.07% reckoned by weight on the quantity of silver in that emulsion.

6. A photographic emulsion which is sensitive to that region of the spectrum to which a silver bromide emulsion is normally sensitive but not to red light nor to any substantial extent to green light, said emulsion comprising silver chloride and 2:2' diethyloxacarbocyanine iodide in amount up to about 0.07% reckoned by weight on the quantity of silver in the emulsion.

7. A photographic material comprising a support coated with an emulsion which is sensitive to that region of the spectrum to which a silver bromide emulsion is normally sensitive but not to red light nor to any substantial extent to green light, said emulsion comprising silver chloride and 2:2' diethyloxacarbocyanine iodide.

8. A photographic material comprising a support coated with an emulsion which is sensitive to that region of the spectrum to which a silver bromide emulsion is normally sensitive but not to red light nor to any substantial extent to green light, said emulsion comprising silver chloride and a sensitizing dye of the oxacarbocyanine class in amount up to about 0.07% reckoned by weight on the quantity of silver in that emulsion.

9. A photographic material comprising a support coated with an emulsion which is sensitive to that region of the spectrum to which a silver bromide emulsion is normally sensitive but not to red light nor to any substantial extent to green light, said emulsion comprising silver chloride and 2:2' diethyloxacarbocyanine iodide in amount up to about 0.07% reckoned by weight on the quantity of silver in the emulsion.

10. A photographic emulsion which is sensitive to that region of the spectrum to which a silver bromide emulsion is normally sensitive but not to red light nor to any substantial extent to green light, said emulsion comprising silver chloride and a sensitizing dye of the oxacarbocyanine group.

11. A photographic material comprising a support coated with an emulsion which is sensitive to that region of the spectrum to which a silver bromide emulsion is normally sensitive, but not to red light nor to any substantial extent to green light, said emulsion comprising silver chloride and a sensitizing dye of the oxacarbocyanine group.

OLAF BLOCH.